United States Patent
Montuore

(10) Patent No.: US 7,938,491 B2
(45) Date of Patent: May 10, 2011

(54) HEADREST

(76) Inventor: Robert J. Montuore, Florham Park, NJ (US)

( * ) Notice: Subject to any disclaimer, the term of this patent is extended or adjusted under 35 U.S.C. 154(b) by 108 days.

(21) Appl. No.: 12/315,093

(22) Filed: Nov. 28, 2008

(65) Prior Publication Data

US 2010/0133888 A1 Jun. 3, 2010

(51) Int. Cl.
*B60R 22/28* (2006.01)
*A47C 7/38* (2006.01)

(52) U.S. Cl. ........................................... 297/397
(58) Field of Classification Search ................. 297/393, 297/397, 391
See application file for complete search history.

(56) References Cited

U.S. PATENT DOCUMENTS

| | | | | |
|---|---|---|---|---|
| 4,440,443 A * | 4/1984 | Nordskog | ...................... | 297/397 |
| 5,015,036 A * | 5/1991 | Fergie | ............................ | 297/397 |
| 5,154,477 A * | 10/1992 | Lacy | .............................. | 297/397 |
| 5,505,523 A * | 4/1996 | Wang | ............................. | 297/393 |
| 7,331,631 B1 * | 2/2008 | Yeh | .................................. | 297/391 |
| 2006/0273650 A1 * | 12/2006 | Embach | ................... | 297/452.27 |

* cited by examiner

*Primary Examiner* — Milton Nelson, Jr.

(57) ABSTRACT

A device, system, and method for a headrest are disclosed herein. The headrest may have an orthopedic cervical support comprised of a semi-rigid polystyrene base and/or a memory foam or polyurethane foam covering for comfort. The curved shape of the headrest provides a full head support backing with two concave sides of equal proportion to support the head while turned as well as preventing a child or adult's head from tilting at an uncomfortable angle while at rest.

17 Claims, 6 Drawing Sheets

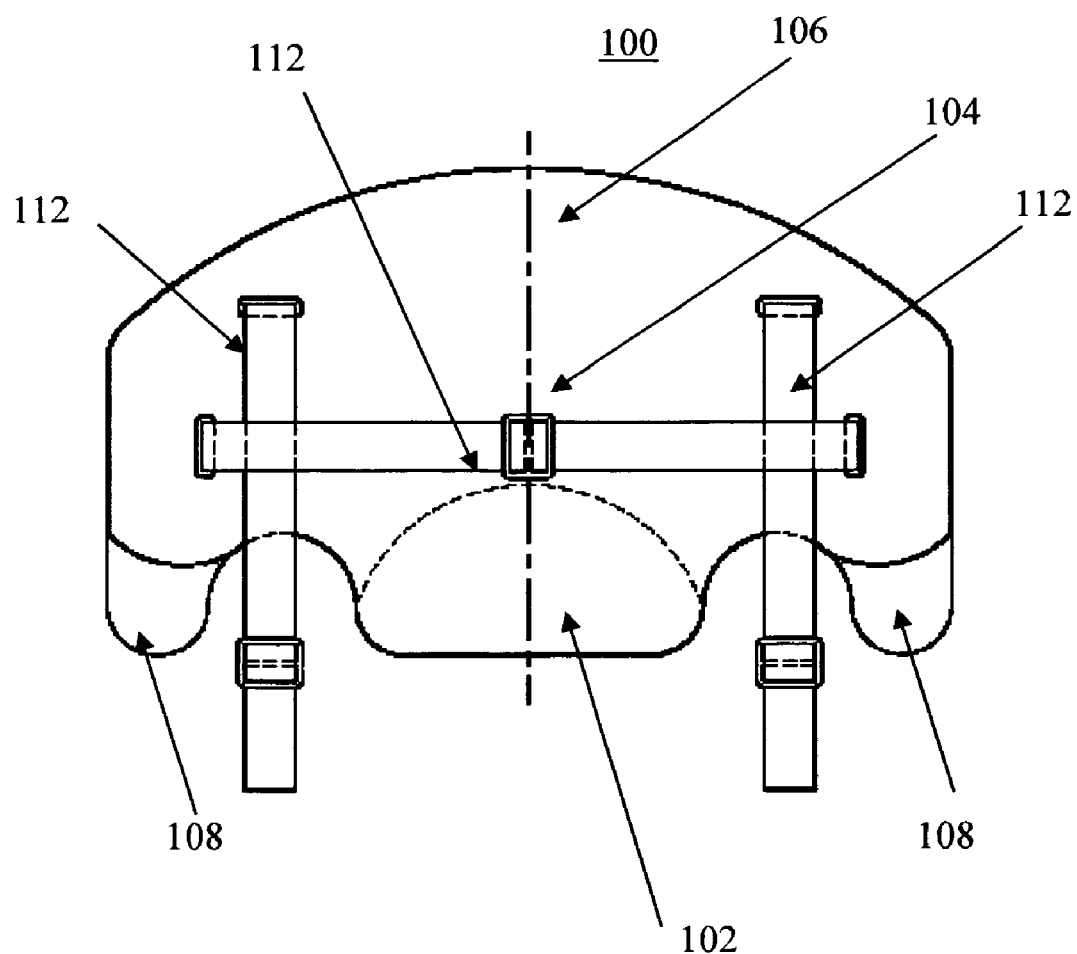

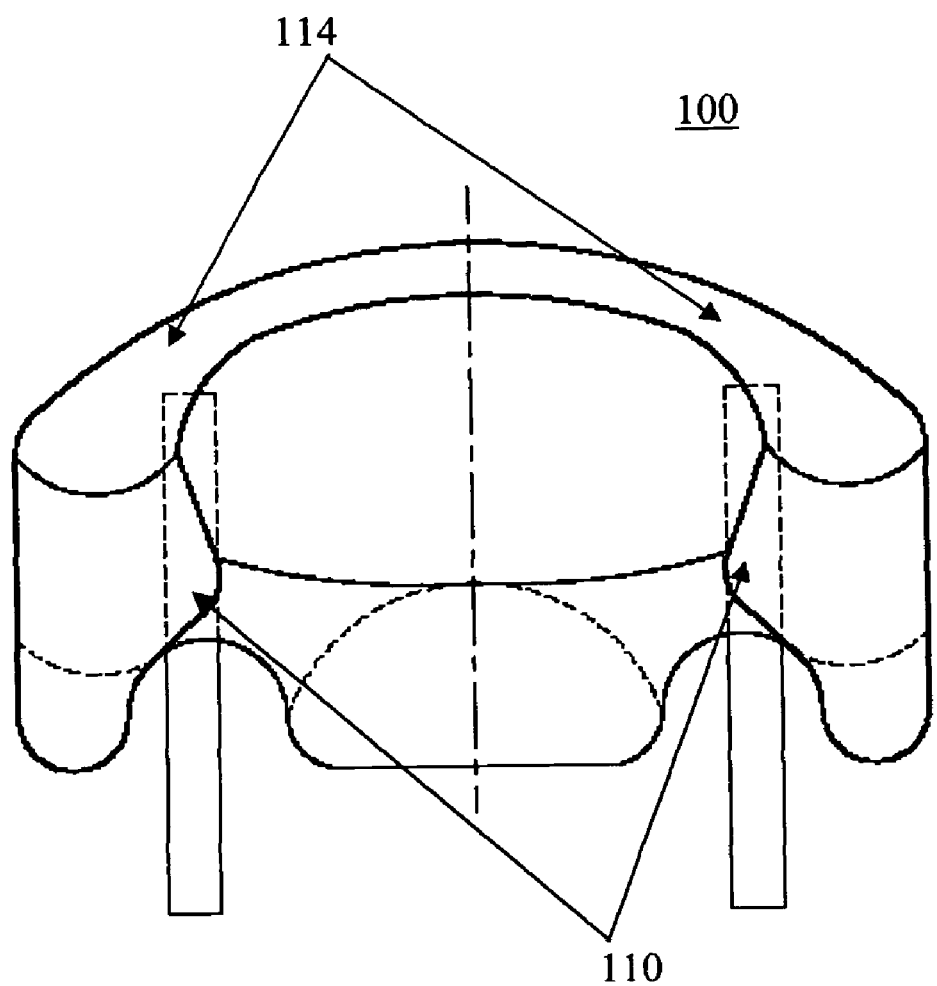

HEADREST

TECHNICAL FIELD

The present invention relates to a headrest and more particularly, relates to a device for head and back support in an upright position.

BACKGROUND INFORMATION

The human spine extends from the back of the skull down the torso of the human body. A normal, healthy spine includes slight undulating curves as the spine extends downward. These curves help the body maintain an upright position and keep the body balanced. The cervical curvature arcs in the forward direction between the bottom of the skull to the shoulder blades. From the shoulder blades the spine arcs in a rearward direction down to the lumbar. Poor posture can cause stress on the vertebra of the spine and result in a straightening of the spine.

Cervical kyphosis is a condition wherein the normal curve of the neck begins to straighten. This may result in the normal lordotic curve in the neck being lost. Cervical kyphosis can progress to the point where the curve in the neck can result in a reverse curve shape, going in the opposite direction from the spine's normal, healthy position. This unhealthy position results in greater degeneration of the cartilage disks between the vertebra resulting in pain and possible permanent damage.

U-shaped travel pillows currently available provide little support for the head in a resting position. The U-shaped pillow wraps around the neck of the user and provides little support when the user is in a resting position. During sleep, the head of an individual tends to slump to the side in an unnatural sideways, angled position. Little to no support is provided to maintain the head in an upright position. The head may also extend backwards, tilted beyond the upright position resulting in an overextension of the cervical curvature. In addition, the weight of the head is not distributed over the shoulders and upper back evenly.

SUMMARY

The present invention is a novel device, system, and method for a semi-rigid, transportable headrest for supporting a human head in an upright position. The exemplary headrest may have a cervical support having an convex profile and sized to receive the neck and upper back of a human, a top head support extending outward and sized to receive both the rear and top of a human head, and a rear head support coupling the top head support to the cervical support. Lateral head supports may extend from each side of the rear head support, outwardly more than half the width of a human head.

The invention may include one or more of the following embodiments. In one exemplary embodiment, the concave profile of the cervical support may replicate the profile of a human cervical spine. In another exemplary embodiment the complete headrest is made of a semi-rigid polystyrene and/or a layer of memory foam may cover portions of an outer surface of the headrest. The headrest may also have a removable and washable fabric cover. In another embodiment, the headrest may have adjustable straps or other securing device to secure the headrest to a seat. In another embodiment, the weight of the headrest may be supported by a combination of the top head support and the cervical support. In yet another embodiment, each lateral head support may have a front head support extending inward and have a curved surface sized to receive the temple and forehead of a human.

The present invention is not intended to be limited to any one exemplary headrest or method embodiment that must satisfy one or more of any stated objects or features of the invention. It is also important to note that the present invention is not limited to the exemplary or primary embodiments described herein. Modifications and substitutions by one of ordinary skill in the art are considered to be within the scope of the present invention, which is not to be limited except by the following claims.

BRIEF DESCRIPTION OF THE DRAWINGS

These and other features and advantages of the present invention will be better understood by reading the following detailed description, taken together with the drawings wherein:

FIG. 1B is a rear profile view of the headrest according to an exemplary embodiment of the invention.

FIG. 1C is a front profile view of the headrest according to an exemplary embodiment of the invention.

DETAILED DESCRIPTION

The invention provides an ergonomically designed headrest that provides orthopedic cervical support. The curved shape of the headrest embodiments may help to support the user's head in an upright position. Two concave sides of equal proportion may support the head while turned as well as prevent the head from tilting at an uncomfortable angle while at rest. Sides of the headrest may be configured at approximately a 70-degree angle with a slight curvature. A fully attached cervical support and rear support may have an integrated cervical lordotic fixed support. This design allows for the user's spine to follow the natural curve of the neck vertebrae. The two sides of this device may be configured at approximately 30 degree angles with a slight curvature. This design allows the user's neck to follow the natural design of human neck vertebrae. Embodiments of the headrest may comprise a semi-rigid polystyrene base and a memory foam or polyurethane foam covering for comfort.

Figure 1A:
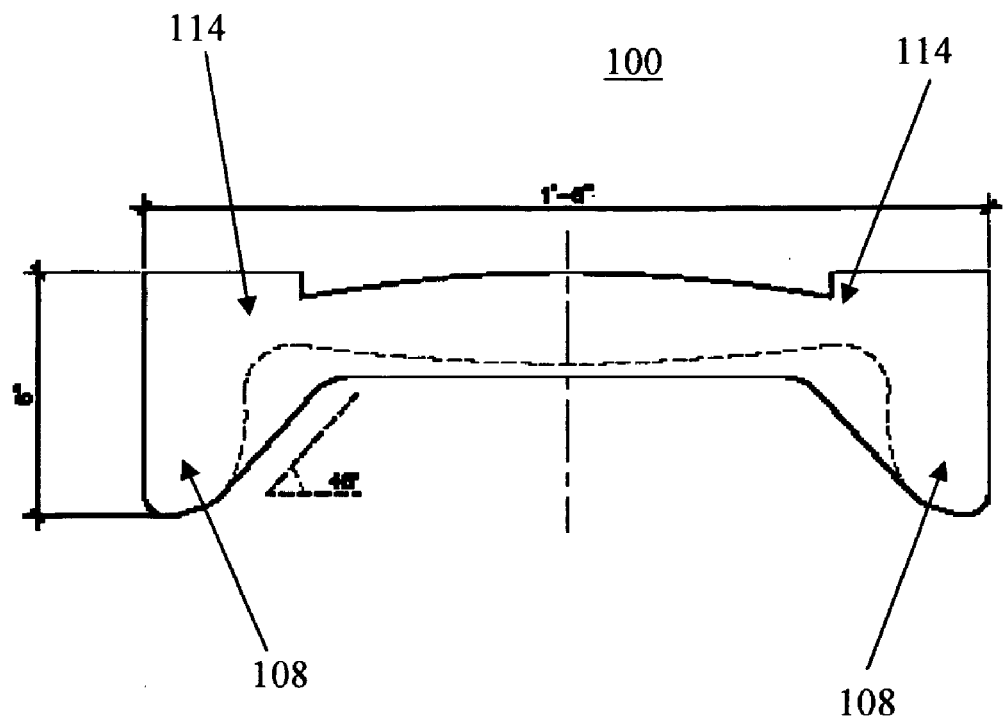
FIG. 1A is a top plane view of the headrest according to an exemplary embodiment of the invention.
Figure 1D:
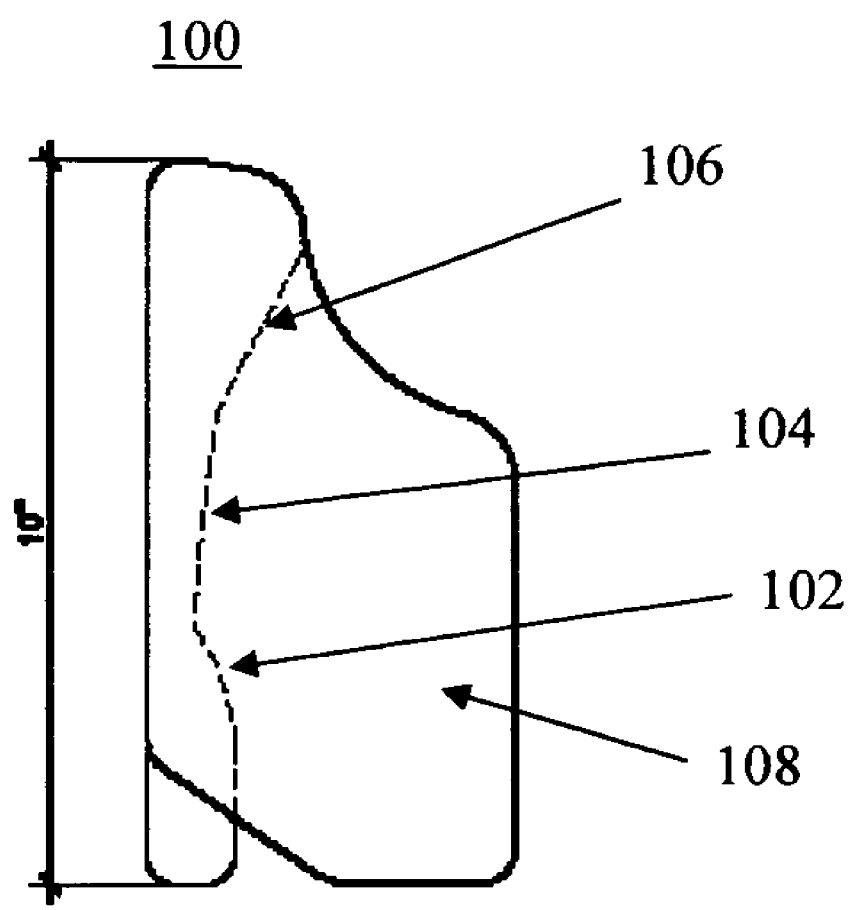
FIG. 1D is a left profile view of the headrest according to an exemplary embodiment of the invention.
Figure 1E:
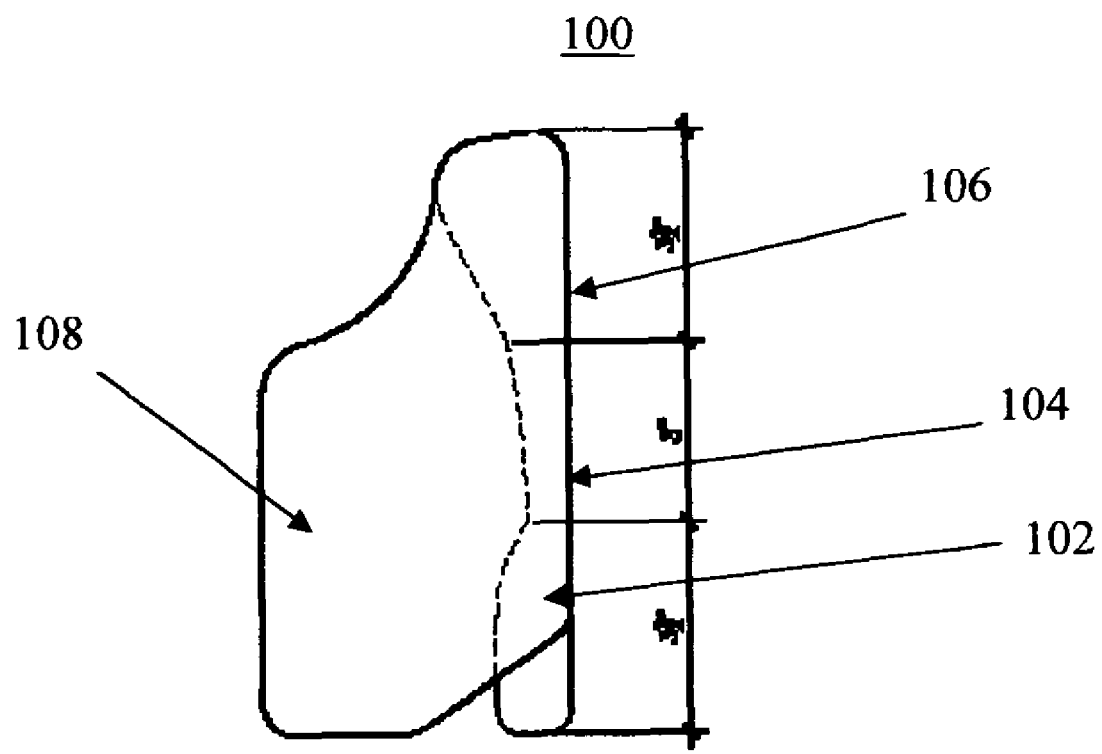
FIG. 1E is a left profile view of the headrest according to an exemplary embodiment of the invention.
Figure 1F:
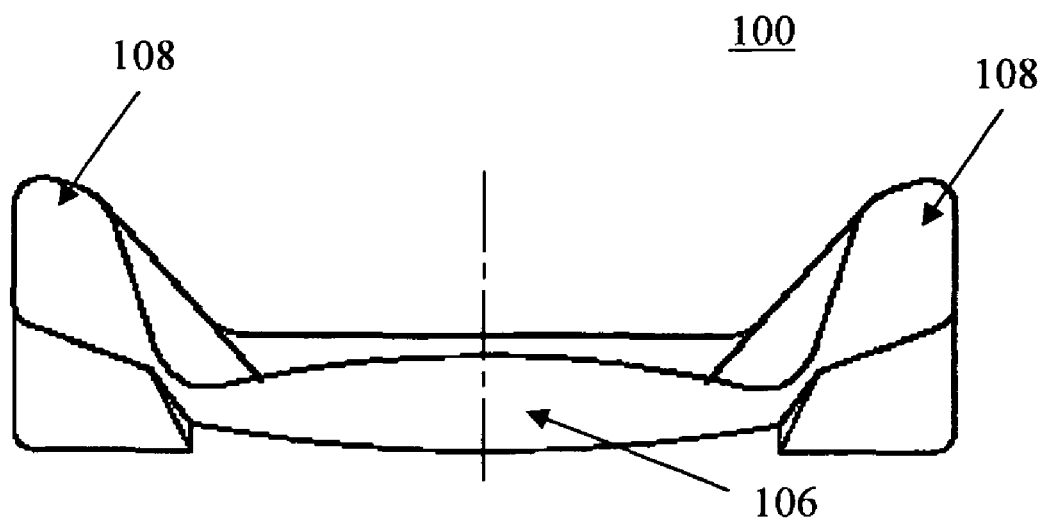
FIG. 1F is a bottom plane view of the headrest according to an exemplary embodiment of the invention.

Referring to FIGS. 1A-E, an exemplary headrest 100 may comprise three sections: a cervical support 102, a rear head support 104, and a top head support 106. Lateral head supports 108 may extend from each side of the headrest 100. Each lateral head support 108 may include a front head support 110 to aid in maintaining the user's head in an upright position while at rest.

The headrest 100 may have a total length of about ten inches from the top to the bottom. The cervical support 102 may have a concave profile and be sized to receive the neck and upper back of a human. At the bottom of the cervical support 102, the concave profile joins into the bottom surface of the headrest 100 allowing the bottom surface and front surface of the cervical support to rest within the convex profile of the concave surface neck and upper back of the user. At the top of the cervical support 102, the concave profile joins the convex profile of the rear head support 104. The cervical support 102 has a length of about three and one-half inches or about a third of the total length of the headrest 100. The concave profile of the cervical support 102 allows a user's upper back and user's neck to rest against the support in the normal upright position of the human neck and back. The shape of the concave profile allows some of the weight of the headrest 100 to be distributed evenly on the shoulders of the user.

The rear head support 104 may have a relatively flat convex surface. The rear head support 102 may be sized to receive the rear skull portion of the human head. The rear head support 104 has a length of about three inches or about a third of the total length of the headrest 100. The rear head support 104 may be centered between the cervical support 102 and top head support 106. The bottom of the rear head support 106 joins into the convex surface of the cervical support 102. The top of the rear head support 106 joins into the rounded profile of the top head support 106.

The top head support 106 may extend in a frontward direction over the top of the user's head. The top head support 106 may have a rounded profile that is sized to fit against the upper and top portion of the human skull. The top head support 106 may extend between two and five inches in the forward direction. The frontward extension of the top head support 106 may allow some of the weight of the headrest 100 to be distributed evenly on the head of the user. In other embodiments, the headrest 100 may be positioned so as to not place any weight of the headrest 100 on the user. The top head support 104 has a length of about three and one-half inches or about a third of the total length of the headrest 100.

Lateral head supports 108 may extend from each side of the headrest 100. The lateral head supports 108 are sized to support and prevent sloping of the human head. Each lateral head support 108 may extend outwardly a distance of about five inches. The combination of both lateral head supports 108 and rear head support 104 provide a U-shaped cavity designed to receive the head. The U-shaped cavity may be designed to provide room for movement of the head as well as limit or provide support for the head in a lateral direction no more than twenty degrees from a straight and vertical position of the head. The headrest 100 is not limited to twenty degrees and embodiments may increase or decrease the desired angle. Frame support, as discussed later herein, may allow the angle to be adjusted to the user-desired dimensions. For example, a flexible frame or a hinge or jointed frame may allow the user to manually adjust the position of the lateral head supports 108. The frame or joint may be adjustable with force from the user's hand by providing enough strength to support lateral forces of the head in a rest position. Each lateral head support 108 may extend outwardly a distance of about two to six inches. The distance may be about the average of one-fourth to three-fourths the width of a human head.

In another embodiment, each lateral head support 108 has a front head support 110 extending inward and having a curved surface sized to receive the temple and forehead of a human and prevent the forward movement of the human in a relaxed position. In this embodiment, each lateral head support 108 extends outwardly just beyond the user's forehead. The front head support 110 extends inward producing more of a C-shaped cavity around the head of the user. The front head support 110 may have a rounded profile to allow the outer regions of the forehead to rest against the front head support 110. This may allow the user's head to remain in an upright position at rest and prevent the user's head from falling in a forward direction.

In another embodiment, each lateral head support 108 has a hinged joint 114 of the frame to allow movement of the lateral head support 108. This allows the user to adjust the lateral head support 108 in a lateral direction. The hinged joints 114 may be a variety of joints, for example but not limited to, a traditional hinge, a ball and socket joint, or a racket type hinge joint, or flexible material joint. The hinged joint 114 may be designed to support lateral force of the head but week enough to allow manual adjustment by the users hands. The user may adjust each side of the lateral head support 108 according to the user's preferences.

The headrest 100 may have adjustable straps 112 to secure the headrest 100 to a seat. The straps may be used to hold the headrest 100 in the correct height to the back of a chair or seat. The straps 112 may fasten around the back of the seat and/or to the top of the seat. Adjustments to the straps may allow a user to customize the desired height to the height of the user. The straps 112 may allow the weight and forces placed on the headrest 100 to be transferred to the seat. The straps may be tailored to accommodate the various industry standards.

The straps 112, for example, may comply with the LATCH (Lower Anchors and Tethers for Children) standard. LATCH is an attachment system that eliminates the need to use seat belts to secure the car safety seat. Vehicles have at least two sets of small bars, called anchors, located in the back seat where the cushions meet. Car safety seats that come with LATCH have a set of attachments that fasten to these anchors. Nearly all passenger vehicles and all car safety seats made on or after Sep. 1, 2002, come with LATCH. However, unless both your vehicle and the car safety seat have this anchor system, the user may still need to use seat belts to install a car safety seat.

In another example, the straps 112 may have a tether. The tether is a strap that attaches to the top of a car safety seat and to an anchor located on the rear window ledge, on the back of the vehicle seat, or on the floor or ceiling of the vehicle. Tethers give extra protection by keeping the car headrest 100 and the child's head from moving too far forward in a crash or sudden stop. Tethers may be part of the LATCH attachment system, though they should not be confused with lower LATCH attachments; the tether is a longer strap at the top of the seat and the lower LATCH attachments are located at or near the base of the seat.

In addition to straps 112, the headrest 100 may use other devices to semi-permanently secure the headrest 100 to the seat. For example, the rear surface of the headrest may have hook-fasteners of the hook and loop variety. The hook-fasteners may be used for coupling to a fabric surface of a seat. The hook-fastener may help support the weight of the headrest 100 and/or hold the headrest 100 in place when not in use. The hook-fastener allows the headrest 100 to be easily removed and coupled to a variety of seats. The headrest 100 is not limited to the exemplary fasteners disclosed herein and may use a variety of fasteners.

The headrest may be manufactured using foam that is formed to this design with an adhesive spray affixed to the base and sides for foam application. The foam affixed to this base may be comprised of a memory type material to ensure comfort and support. The combined piece may then be placed inside a protective, washable cover with attached, interlocking, adjustable hook and loop straps. The adjustable straps may also allow for vertical adjustments to conform to differently sized people. Furthermore, the adjustable straps may slide over a vehicle's rear seat headrests and seatbacks for attachment. Previously discussed tether and latch-based connective straps may be used in conjunction. These straps will be affixed to the back of the headrest 100.

The headrest 100 may also be manufactured using foam that is thermally formed to this design with an adhesive spray affixed to the base and sides for foam application. The foam affixed to this base may be comprised of another foam type material to ensure comfort and support or no foam. The headrest 100 may be a one-piece design which may allow for cost effective manufacturing and easy transportability of the headrest 100.

The headrest 100 may also comprise an internal frame for additional structure and support. The internal frame may be made of plastic or metal. The internal frame may be made of a rigid or flexible material. The flexible frame material may allow a user to adjust the overall shape of the headrest 100 to a user's preferences. The internal frame may also be of a rigid nature for safety purposes. As previously discussed the internal frame may have hinged joints 114 or joints. These joints may have set points or locking points to allow the user to select between various positions. The headrest 100 is not limited to having an internal frame. The headrest 100 may be constructed of purely rigid foam as previously discussed.

Modifications and substitutions by one of ordinary skill in the art are considered to be within the scope of the present invention, which is not to be limited except by the following claims.

The invention claimed is:

1. A semi-rigid, transportable, upright headrest for supporting an adult human head in an upright position wherein the transportable, upright headrest is made completely of semi-rigid polystyrene foam and comprises:
   a cervical support having a convex profile and sized to receive a neck and upper back of a human;
   a top head support extending outward and sized to receive both the rear and top of a human head;
   a rear head support coupling the top head support to the cervical support; and
   lateral head supports extending from each side of the rear head support, outwardly five inches wherein each lateral head support has a front head support extending inward and having a curved surface sized to receive the temple and forehead of a human, each lateral head supports are sized to support and prevent sloping of the human head in a lateral direction no more than twenty degrees from a straight and vertical position and each lateral head support is substantially supported by a locking, hinged joint of an internal frame of the semi-rigid, transportable, upright headrest.

2. A semi-rigid, removable, upright headrest for supporting an adolescent human head in an upright position comprising:
   a cervical support having a length of about three and one-half inches and a convex profile of a neck and upper spine of an adolescent human,
   a top head support having a length of about three and one-half inches and a concave profile of a rear and top skull of an adolescent human,
   a rear head support having a length of about three inches and a concave profile of a rear skull of an adolescent human, and
   lateral head supports extending from each side of the rear head support a distance of five inches; wherein each lateral head support has a front head support extending inward and having a curved surface sized to receive the temple and forehead of a human, each lateral head support is sized to support and prevent sloping of the human head in a lateral direction no more than twenty degrees from a straight and vertical position, and structure support of each of the lateral head support consists essentially of an internal frame coupling each lateral head support to the removable, upright headrest and
   wherein the removable, upright headrest is made of semi-rigid polystyrene foam coupled to the internal frame and the weight of the headrest is supported by a combination of the top head support, lateral head supports, and the cervical support.

3. A semi-rigid, removable, upright headrest of claim 2, wherein the convex profile of the cervical support replicates the profile of a human cervical spine.

4. A semi-rigid, removable, upright headrest of claim 2, wherein the headrest is made of the semi-rigid polystyrene foam with a layer of memory foam covering portions of an outer surface of the headrest.

5. A semi-rigid, removable, upright headrest of claim 2, wherein the headrest has adjustable straps to secure the headrest to a seat.

6. A semi-rigid, removable, upright headrest of claim 2, wherein the lateral head supports extending from each side of the rear head support, outwardly more than about two inches.

7. A semi-rigid, removable, upright headrest of claim 2, wherein the weight of the headrest is supported by a combination of the top head support and the cervical support.

8. A semi-rigid, removable, upright headrest of claim 2, wherein a rear surface of the headrest has hook-fasteners for coupling to a fabric surface of a seat.

9. A semi-rigid, removable, upright headrest of claim 2, further comprising a removable and washable fabric cover.

10. A semi-rigid, removable, upright headrest of claim 2, wherein each lateral head support is coupled to the rear head support by a flexible joint.

11. A semi-rigid, removable, upright headrest of claim 2, wherein the lateral head supports are sized to support and prevent sloping of the human head in a lateral direction no more than twenty degrees from a straight and vertical position.

12. A semi-rigid, removable, upright headrest of claim 2, wherein the headrest has straps to secure the headrest to standard Lower Anchors and Tethers for Children in a vehicle.

13. A semi-rigid, removable, upright headrest of claim 2, wherein the headrest has straps to secure the headrest to a tether of a standard Lower Anchors and Tethers for Children in a vehicle.

14. A semi-rigid, removable, upright headrest of claim 2, wherein each lateral head support is coupled to the rear head support by a hinged joint with a locking position when the front head support is extended inward and prevent a forward movement of the human in a relaxed position.

15. A semi-rigid, removable, upright headrest of claim 2, wherein the total width of the headrest is about seventeen inches.

16. A semi-rigid, removable, upright headrest of claim 2, wherein each of the lateral head supports extending outwardly a distance of about five inches.

17. A semi-rigid, removable, upright headrest of claim 2, wherein the cervical support has a length of about three and one-half inches; the rear head support has length of about three inches; and the top head support has a length of about three and one-half inches.

* * * * *